(12) United States Patent
Endo et al.

(10) Patent No.: US 8,053,115 B2
(45) Date of Patent: Nov. 8, 2011

(54) ACTIVE MATERIAL FOR LITHIUM ION BATTERY HAVING MG-CONTAINING LITHIUM TITANATE AND LITHIUM ION BATTERY

(75) Inventors: Daisuke Endo, Kyoto (JP); Tokuo Inamasu, Kyoto (JP); Toshiyuki Nukuda, Kyoto (JP); Yoshihiro Katayama, Kyoto (JP)

(73) Assignee: GS Yuasa International Ltd., Kyoto-Shi, Tokyo (JP)

( * ) Notice: Subject to any disclaimer, the term of this patent is extended or adjusted under 35 U.S.C. 154(b) by 252 days.

(21) Appl. No.: 11/887,407

(22) PCT Filed: Mar. 22, 2006

(86) PCT No.: PCT/JP2006/306390
§ 371 (c)(1),
(2), (4) Date: Sep. 28, 2007

(87) PCT Pub. No.: WO2006/106701
PCT Pub. Date: Oct. 12, 2006

(65) Prior Publication Data
US 2009/0269668 A1    Oct. 29, 2009

(30) Foreign Application Priority Data

Mar. 30, 2005   (JP) .................................. 2005-098963

(51) Int. Cl.
*H01M 4/02* (2006.01)
*H01M 4/04* (2006.01)
(52) U.S. Cl. ............... 429/231.6; 252/182.1; 429/231.5; 429/231.9; 429/231.95
(58) Field of Classification Search .. 429/231.1–231.95, 429/231.6; 252/182.1
See application file for complete search history.

(56) References Cited

U.S. PATENT DOCUMENTS 6,221,531 B1 *  4/2001  Vaughey et al. ........... 429/231.1
2006/0177739 A1 *  8/2006  Endo et al. ............... 429/231.95

FOREIGN PATENT DOCUMENTS

| JP | H06-275263 |   | 9/1994 |
| JP | H10-251020 |   | 9/1998 |
| JP | 2000-156229 |   | 6/2000 |
| JP | 2000156229 | * | 6/2000 |
| JP | 2001-185141 |   | 7/2001 |
| JP | 2001-250554 |   | 9/2001 |
| JP | 2004-235144 |   | 8/2004 |
| JP | 2004235144 | * | 8/2004 |
| WO | WO 2005008812 | * | 1/2005 |

OTHER PUBLICATIONS

JP-2000156229-Translation.*
JP-2004235144-Translation.*
JP 10-251020 Translation.*
Sun et al. "Synthesis and electrochemical characterization of spinel Li[Li(1-x)/3CrxTi(5-2x)/3]O4 anode materials", Journal of Power Sources 125, 242-245, 2004.*
Chen et al., "Studies of Mg-Substituted Li4-xMgxTi5O12 Spinel Electrodes (0×1) for Lithium Batteries", J. Electrochem. Soc., vol. 148, Issue 1, pp. A102-A104 (2001).*
JP 10-251020 Translation-1998.*
JP 2000156229-Translation-2000.*
JP-2004235144-Translation-2004.*
Shahua Huang et al, Preparation and Electrochemical performance of spinel-type compounds $Li_4Al_yTi_{5-y}O12$, , Journal of the Electrochemical Society, vol. 152, No. 1, Jan. 2005, pp. A186-A190.
A.D. Robertson et al, New inorganic spinel oxides for use as negative electrode materials in future lithium-iion batteries, Journal of Power Sources, vol. 81-82, 1999, pp. 352 to 357.

* cited by examiner

*Primary Examiner* — Patrick Ryan
*Assistant Examiner* — Ladan Mohaddes
(74) *Attorney, Agent, or Firm* — Manabu Kanesaka

(57) ABSTRACT

It is an object of the present invention to provide an active material for lithium ion battery having an excellent discharge capacity in the potential flat part and a high-performance and long-life lithium ion battery, and particularly to provide a technology of improving voltage flatness. The present invention provides an active material for lithium ion battery represented by a composition formula: $Li[Li_{(1-2x)/3}Mg_xTi_{(5-x)/3}]O_4$ (0<x<1/2) in which a part of the element of lithium titanate is substituted with Mg, and a lithium ion battery using this active material as a negative electrode active material.

8 Claims, 2 Drawing Sheets

ACTIVE MATERIAL FOR LITHIUM ION BATTERY HAVING MG-CONTAINING LITHIUM TITANATE AND LITHIUM ION BATTERY

TECHNICAL FIELD

The present invention relates to an active material for lithium ion battery having Mg-containing lithium titanate and a lithium ion battery.

BACKGROUND ART

Associated with recent small-sized high-performance mobile phones and electronic devices, nonaqueous electrolyte batteries such as lithium secondary batteries exhibiting high energy density with high voltage draw attention and are widely used as the power source thereof.

Conventionally, it is known to use lithium titanate as an active material for a negative electrode in such lithium secondary batteries and lithium ion batteries (see, Patent Document 1). Further, it is known to substitute a part of the element of the lithium titanate with Fe (see, Patent Document 2), with Cu (see, Patent Document 3) and with other transition metals and the like (see, Patent Documents 4 to 6).

Patent Document 1: JP 06-275263-A
Patent Document 2: JP 2001-185141-A
Patent Document 3: JP 2001-250554-A
Patent Document 4: JP 2004-235144-A
Patent Document 5: JP 10-251020-A
Patent Document 6: JP 2000-156229-A Particularly, Patent Document 4 describes an invention of "a negative electrode active material for nonaqueous secondary battery having a lithium transition metal composite oxide having a spinel structure containing an alkali metal and/or alkali earth metal." (claim 1). However, "a contained alkali metal and/or alkali earth metal stabilizes a crystalline structure of the lithium transition metal composite oxide having a spinel structure, thereby possibly improving cycle characteristics." (paragraph [0022]). As there is described that "lithium titanate represented by a general formula $Li_aTi_bO_{4+c}$ (where M denotes at least one element selected from the group comprising one or more transition metals except titanium, 2, 13 and 14 group elements of the periodic table, halogen elements and sulfur, a+b denotes a number satisfying $0.8 \leq a+d \leq 1.5$, b denotes a number satisfying $1.5 \leq b \leq 2.2$, and c denotes a number satisfying $-0.5 \leq c. \leq 0.5$) improves cycle characteristics, stability and reliability." (paragraph [0029]), the invention described in the Patent Document 4 has absolutely an object of improving cycle characteristics and the like by adding less than or equal to 0.1 mol of an alkali earth metal such as Mg or the like to lithium titanate and has no object of reducing voltage variations during discharge (of improving voltage flatness). Moreover, as lithium titanate satisfying the above-described general formula, there is described a negative electrode active material of $Li_{1.26}Ti_{1.72}Mg_{0.02}$ in which Ti-content is high and Mg-content is low (when Li and Mg contain the above-described amounts, Ti becomes tetravalent ($Ti^{4+}$) in an amount of 1.675 mols, and thus it becomes partially trivalent ($Ti^{3+}$) in an amount of 1.72 mols) (see example 1). However, as described below, this Mg-containing lithium titanate is inferior in electrochemical capacity.

Patent Document 5 describes an invention of "metal-substituted lithium titanate represented by a general formula $Li_xM_yTi_zO_4$ (where M is a metal having a valence of two or more, and $0.5 \leq (X+Y)/Z \leq 2$), in which a part of a lithium component of lithium titanate is substituted by a metal having a valence of two or more" (claim 1), and magnesium is described as a metal having a valence of two or more (claim 2). However, as it is described that "doping and dedoping of lithium ions are facilitated by substituting a part of a lithium component with a metal having a valence of two or more, thereby enabling characteristics such as battery capacity and the like to be improved when used as an electrode for a lithium battery" only a part of the lithium component is substituted with magnesium, and no titanium component is substituted therewith. Further, this invention has no object of reducing voltage variations during discharge (of improving voltage flatness).

Moreover, it is further known to use a spinel compound represented by a composition formula: $Li_{4-x}Mg_xTi_5O_{12}$ ($0 \leq x \leq 1$) as a negative electrode of a lithium battery (see Non-Patent Document 1).

Non-Patent Document 1: Journal of The Electrochemical Society, 148(1) A102-A104 (2001)

The spinel compound in the Non-Patent Document 1 is one in which only a part of Ti of $Li_4Ti_5O_{12}$ (lithium titanate) is substituted with Mg. Although it is described that conductivity and high rate discharge characteristic can be improved by using this Mg-containing lithium titanate, it is not described that voltage variations during discharge can be reduced (voltage flatness can be improved). Moreover, in the above-described composition formula, Mg is a divalent representative element ($Mg^{2+}$), and since only a part of monovalent Li component ($Li^{1+}$) is substituted with Mg having the same number of moles and no tetravalent Ti component ($Ti^{4+}$) is substituted with Mg, a part of Ti becomes partially trivalent ($Ti^{3+}$)

On the other hand, a spinel compound represented by a composition formula: $Li[Li_{(1-x)/3}Cr_xTi_{(5-2x)/3}]$ is further known as a negative electrode active material of a lithium ion battery (see Non-Patent Document 2).

Non-Patent Document 2: Journal of Power Sources, 125 (2004) 242-245

The spinel compound in the Non-Patent Document 2 is one in which a part of Li— and Ti components of $Li_{4/3}Ti_{5/3}O_4$ (lithium titanate) is substituted with Cr. Although it is described that diffusion coefficient and high rate discharge performance are improved by using this Cr-containing lithium titanate, it is not described that voltage variations during discharge can be reduced (voltage flatness can be improved). Moreover, in the above-described composition formula, Cr is trivalent ($Cr^{3+}$) and Ti is tetravalent ($Ti^{4+}$). However, since Cr is a transition metal, the valence number of Cr will vary due to electrochemical reduction of lithium titanate when such lithium titanate is used as a negative electrode active material of a battery. In order to provide a negative electrode containing lithium titanate with an excellent discharge capacity in the potential flat part, it is important that tetravalent Ti ($Ti^{4+}$) and trivalent Ti ($Ti^{3+}$) coexist in lithium titanate contained in the negative electrode which has been charged for the first time after the composition of the battery and it is further desired that trivalent Ti ($Ti^{3+}$) exists more than tetravalent Ti ($Ti^{4+}$). However, so the valence number of Cr varies due to electrochemical reduction of lithium titanate, trivalent Ti ($Ti^{3+}$) is produced insufficiently, thereby making it difficult to make an above-described effect.

DISCLOSURE OF THE INVENTION

Problems to be Solved by the Invention

As disclosed in the Patent Document 1, it is known to use lithium titanate as a negative electrode active material of a lithium secondary battery or lithium ion battery. This lithium titanate is characterized in that it can provide a battery of which voltage variations are small (voltage flatness is high) for long periods of time during discharge because it exhibits small potential variations (high potential flatness).

However, recently, with a size reduction and high performance of mobile phones and electronic devices, it is desired to provide an active material capable of further improving the voltage flatness.

The present invention has been carried out in view of the above-described desire, and it is a technical object of the present invention to provide an active material for lithium ion battery having an excellent discharge capacity in the voltage flat part and to provide a high capacity and long life lithium ion battery. Particularly, the present invention is to provide a technology of improving voltage flatness.

Means for Solving the Problems

As a means for solving the above-described problems, an active material for lithium ion battery according to the present invention is characterized in that it has a particular composition in which parts of both of titanium (Ti) and lithium (Li) are substituted with magnesium (Mg) and that Ti is tetravalent ($Ti^{4+}$) as an active material before the first electrochemical reduction occurs after the composition of a battery. That is, in Mg-containing lithium titanate having a composition formula as in the invention described in the Patent Document 4 and Non-Patent Document 1, a part of Ti inevitably becomes trivalent ($Ti^{3+}$). Parts of both of titanium (Ti) and lithium (Li) are substituted with Mg to use a spinel compound containing tetravalent Ti ($Ti^{4+}$) as an active material for lithium ion battery, and therefore the present invention solves the above-described problems.

In order to solve the above-described problems, the present invention employs the following means:

(1) an active material for lithium ion battery represented by a composition formula:

$$Li[Li_{(1-2x)/3}Mg_xTi_{(5-x)/3}]O_4 (0<x<1/2);$$

(2) the active material for lithium ion battery of the above-described (1) characterized by $0<x\leq1/4$;

(3) the active material for lithium ion battery of the above-described (1) characterized by $0.1<x\leq1/4$; and (4) a lithium ion battery using one of the active materials for lithium ion battery of the above-described (1), (2) and (3) as a negative electrode active material.

Advantage of the Invention

The active material for lithium ion battery according to the present invention can provide an active material having an excellent discharge capacity in the potential flat part, and further can provide a high-capacity and long-life lithium ion battery by using the active material as a negative electrode active material.

BEST MODE FOR CARRYING OUT THE INVENTION

Figure 1:
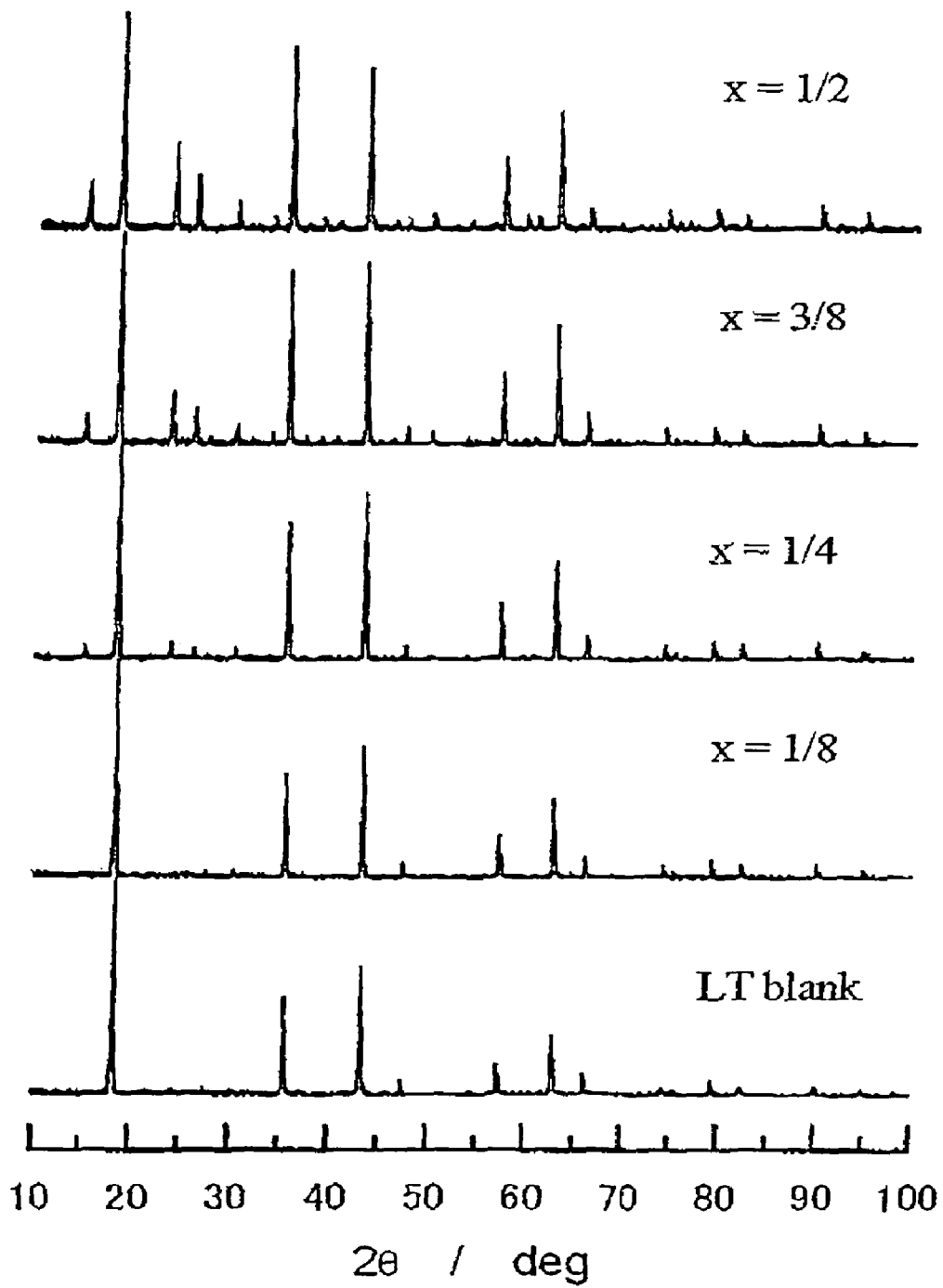
FIG. 1 is a diagram showing a result of X-ray diffraction measurements of $Li[Li_{(1-2x)/3}Mg_xTi_{(5-x)/3}]O_4(0<x<1/2)$.

Now, the present invention will be described with reference to the best modes for carrying out the invention, however, before this description, the present invention will be described further in more detail.

Since $Li[Li_{1/3}Ti_{5/3}]O_4$ as a base material of the active material of the present invention exhibits no volume strain, it is used as a long-life battery material. For it has a flat potential which exhibits a reversible electrode potential of 1.55 V (vs. $Li/Li^+$) during oxidation-reduction and it has a small risk of side reactions such as reduction decomposition of an electrolyte and the like.

Moreover, since this material shows a constant reversible electrode potential during charge and discharge, when composing a lithium ion battery by using this active material as a negative electrode active material for lithium ion battery and combining it with a positive electrode active material for a battery, potential variations on the positive electrode side can be easily estimated from the battery voltage. Therefore, when the capacity of the negative electrode active material almost reaches a theoretical capacity during discharge of this battery, the negative electrode potential rises rapidly, resulting in a sudden drop of the battery voltage. That is, the larger is the capacity corresponding to a flat potential during charge and discharge, the larger can be taken out capacity with keeping the battery voltage high.

So, as a means for solving the above-described problem (provision of an active material of which capacity corresponding to the flat potential during charge and discharge is large, that is, provision of an active material capable of further improving the voltage flatness), the present inventors have found to substitute a part of a six-coordinate 16d site of $Li[Li_{1/3}Ti_{5/3}]O_4$ having a spinel structure with a heterogeneous metal: magnesium (Mg) and accomplished the present invention.

The reason for having selected "Mg" as a substitutional element for the $Li[Li_{1/3}Ti_{5/3}]O_4$ is as follows: The redox species of the $Li[Li_{1/3}Ti_{5/3}]O_4$ is a tetravalent Ti ($Ti^{4+}$), and with a completely reduced $Li_2[Li_{1/3}Ti_{5/3}]O_4$, a two-phase reaction results in a mixed atomic valence state of tri- and tetravalence in which conductive $Ti^{3+}$ coexists. This very reaction produces a reversible electrode potential of 1.55 V (vs. Li). That is, if the substitutional element itself becomes a redox species, such a potential cannot be produced. Therefore, it is considered preferable that $Ti^{4+}$ assumes redox by performing substitution not with a transition metal, but with a representative element having a constant valence number. So "Mg" has been selected as a substitutional element for the $Li[Li_{1/3}Ti_{5/3}]O_4$.

Moreover, there are a large number of examples in which substitution is performed with a transition metal (see the above-described Patent Documents 2 to 6). The representative example includes $LiFeTiO_4$, $Li[CuTi]O_4$ or the like (see the above-described Patent Documents 2 and 3). However, for $Li[CuTi]O_4$, since the redox species on the reduction process is $Ti^{4+}$, a reversible electrode potential of about 1.5 V (vs. $Li/Li^+$) can be obtained, whereas, for $LiFeTiO_4$, since the redox species on the reduction process is $Fe^{3+}$, such a reversible electrode potential cannot be obtained.

The active material for lithium ion battery according to the present invention corresponds a part of a six-coordinate 16d site of $Li[Li_{1/3}Ti_{5/3}]O_4$ were substituted with "Mg" and is represented by a composition formula: $Li[Li_{(1-2x)/3}Mg_xTi_{(5-x)/3}]O_4(0<x<1/2)$ from the number of atoms received in this site and the number of received electrons derived from the valence number. Moreover, even if the composition of the active material for lithium ion battery according to the present invention includes more or less variations from theoretical value, they shall fall within the tolerance.

As described above, in the Patent Document 4, there are disclosed several kinds of Mg-containing lithium titanate starting with $Li_{1.26}Ti_{1.72}Mg_{0.02}O_4$ comprising the active material for lithium ion battery of the present invention and similar constituent elements. However, according to the experiment of the present inventors, far from solving the problem of potential flatness, these kinds of Mg-containing lithium titanate are found to be basically inferior in electrochemical capacity. The cause of this is not exactly clear, however, as a result of analysis by X-ray powder diffractometry, it is shown that there coexists a plurality of crystalline phases in $Li_{1.26}Ti_{1.72}Mg_{0.02}O_4$.

In contrast thereto, there was confirmed a spinel crystalline phase in the active material for lithium ion battery of the present invention. Therefore, it is also important that the active material for lithium ion battery of the present invention satisfies the composition formula:

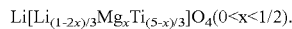

$Li[Li_{(1-2x)/3}Mg_xTi_{(5-x)/3}]O_4(0<x<1/2)$.

The active material satisfying the composition formula can be synthesized when a lithium source, a titanium source and a magnesium source used at the time of synthesis satisfy the composition formula for the mixing ratio (each element ratio) thereof.

Embodiment of Active Material for Lithium Ion Battery According to the Present Invention As described above, the active material for lithium ion battery according to the present invention corresponds a part of a six-coordinate 16d site of $Li[Li_{1/3}Ti_{5/3}]O_4$ were substituted with "Mg" and is represented by a composition formula: $Li[Li_{1-2x)/3}Mg_xTi_{(5-x)/3}]O_4(0<x<1/2)$ derived from the number of atoms received in this site and the number of received electrons derived from the valence number. The synthesis method thereof is not particularly limited. However, the active material for lithium ion battery can be synthesized by firing, for example, $Li_2CO_3$ as lithium source, $TiO_2$ (anatase-type) as titanium source and $Mg(OH)_2$ as magnesium source in an air atmosphere or the like with varying the amount of Mg variously so that a resulting active material may be represented by the composition formula:

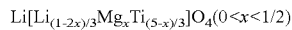

$Li[Li_{(1-2x)/3}Mg_xTi_{(5-x)/3}]O_4(0<x<1/2)$

Embodiment of Lithium Ion Battery According to the Present Invention

In using the active material of the present invention as a negative electrode active material for lithium ion battery, the positive electrode active material as a counter electrode thereof is not particularly limited. However, the positive electrode active material may include a 3.5 V-series active material such as $LiFePO_4$, a 4 V-class positive electrode active materials such as $LiCo_xNi_yMn_{1-x-y}O_2$ ($0<x<1$, $0<y<1$) having a layer structure and $Li[Li_xMn_{2-x}]O_4$ ($0<x<1/3$) having a spinel structure, or a 5 V-series active material such as $Li[M_xMn_{2-x}]O_4(0<x<1$; M is a 3d transition metal element).

Moreover, as an electrolyte, any obvious electrolyte can be used and is not limited by the present invention. However, for example, the electrolyte can include one in which $LiPF_6$ is dissolved in a mixed solvent of ethylene carbonate, ethylmethyl carbonate and dimethyl carbonate.

Further, as a separator there can be used a polypropylene microporous film of which surface has been modified by polyacrylate to improve the retention capacity of an electrolyte, and for an exterior body there can be used a metallic resin composite film comprising polyethylene terephthalate, aluminum foil and metal-adhesive polypropylene film. However, these separator and exterior body are not particularly limited by the present invention.

EXAMPLE

Now, an example of the present invention will be described together with a comparative example, and the present invention will be described concretely. However, the present invention is not limited by the following example.

[Synthemis of Active Materials]

For synthesizing the active materials of the present invention, the lithium source is $Li_2CO_3$, the titanium source is $TiO_2$ (anatase-type), and the magnesium source is $Mg(OH)_2$. These active materials were synthesized by firing these sources at 800° C. for 12 hours in an air atmosphere with varying the amount of Mg variously so that resulting active materials might be represented by the composition formula: $Li[Li_{(1-2x)/3}Mg_xTi_{(5-x)/3}]O_4(0<x<1/2)$ (concretely, with selecting the amount of Mg so that the "x" in the above-described composition formula might be represented by "1/8, 1/4, 3/8 and 1/2").

X-ray diffraction measurements were performed for the obtained active materials and characterization of crystalline structures was performed. As a result, as shown in FIG. 1, there could be obtained a single phase which could be attributed to a spinel structure in a substitution amount of up to x=1/4.

If the value of x in the above-described composition formula is too high, there is a problem that the obtained active materials have no uniform composition and a poor discharge capacity. According to experiments, by keeping the value of x less than or equal to 1/4, as described above, it was confirmed that uniform compositions could be obtained, and concurrently it was also confirmed that the discharge capacity degradation could be suppressed to minimum by keeping x less than or equal to 1/8. Further, it is preferable to keep the value of x more than or equal to 0.1 so that the effect of the present invention may be sufficient.

Among the obtained active materials, $Li[Li_{1/4}Mg_{1/8}Ti_{13/8}]O_4$ having x=1/8 was used as a negative electrode active material for lithium ion battery, and a lithium ion battery was fabricated as follows for evaluation of the battery characteristic.

[Fabrication of Lithium Ion Battery]

$Li[Li_{1/4}Mg_{1/8}Ti_{13/8}]O_4$ active material, acetylene black (AB) and polyvinylidene fluoride (PVdF) were mixed at a "weight ratio of 90:5:5" and N-methylpyrrolidone was added as a dispersing medium thereto. The mixture was kneaded and dispersed to prepare an embrocation. Where, a liquid in which solids ware dissolved and dispersed was used as PVdF, and the liquid was converted into solid weight.

The embrocation was applied to aluminum foil collectors having a thickness of 20 μm to fabricate negative electrode plates. Moreover, in order to ensure similar test conditions for all batteries, the weight and thickness of the electrodes were made identical.

For counter electrodes, $LiCoO_2$ was employed and used as a positive electrode active material. The counter electrodes were fabricated similarly to the case of the negative electrode. However, the weight of the respective positive electrode plates was adjusted to be about 1.5 times as heavy as that of the respective negative electrode plates so that the capacity of the lithium ion battery might control the respective negative electrodes.

As an electrolyte, there was used one in which $LiPF_6$ was dissolved in a mixed solvent of ethylene carbonate (EC), ethylmethyl carbonate (EMC) and dimethyl carbonate (DMC) having a "volume ratio of 6:7:7" so that the solution might have a concentration of 1 mol/l.

As a separator, there was used a polypropylene microporous film of which surface has been modified by polyacrylate to improve the retention capacity of an electrolyte. Moreover, as a reference electrode, a lithium metallic foil put on a nickel plate was used.

For the exterior body, there was used a metallic resin composite film comprising polyethylene terephthalate (15 μm), aluminum foil (50 μm) and metal-adhesive polypropylene film (50 μm). In the exterior body, the electrodes were contained so that the open ends of the positive electrode terminal, negative electrode terminal and reference electrode terminal might be exposed outside. The fusion zones of the opposing inner surfaces of the metallic resin composite film were sealed airtight except a part where a pouring spout was formed.

Under the above-described conditions the lithium ion battery of the example was fabricated.

A lithium ion battery of a comparative example was fabricated under conditions similar to those of the example except that $Li[Li_{1/4}Mg_{1/8}Ti_{13/8}]O_4$ as a negative electrode active material was replaced with $Li[Li_{1/3}Ti_{5/3}]O_4$.

[Evaluation Test of Battery Characteristic]

The lithium ion batteries fabricated as described above were subjected to a charge and discharge test of 5 cycles for an initial activation step. As test conditions, a negative electrode potential against the reference electrode was monitored, charge (reduction) was performed up to 1.0 V at a current value of 0.1 ItA, and then discharge (oxidation) was performed up to 2.5 V at the same current value. In all cycles, a resting period of 30 minutes was set between charge and discharge.

Next, a battery test for assessing the high rate discharge performance was performed. Under conditions similar to those in the initial activation step, a negative electrode potential against the reference electrode was monitored in the test. The current at the time of charge (negative electrode reduction) was set to "0.1 ItA" uniformly, and the current at the time of discharge (negative electrode oxidation) was set to "0.2 ItA, 1 ItA, 2 ItA, 3 ItA and 5 ItA" sequentially. Where, a step of: resting for 30 minutes after the end of one high rate discharge test; performing discharge (negative electrode oxidation) at a current value of 0.1 ItA after recovery to an open circuit potential; and performing charge (negative electrode reduction) after resting further for 30 minutes was repeated.

Figure 2:
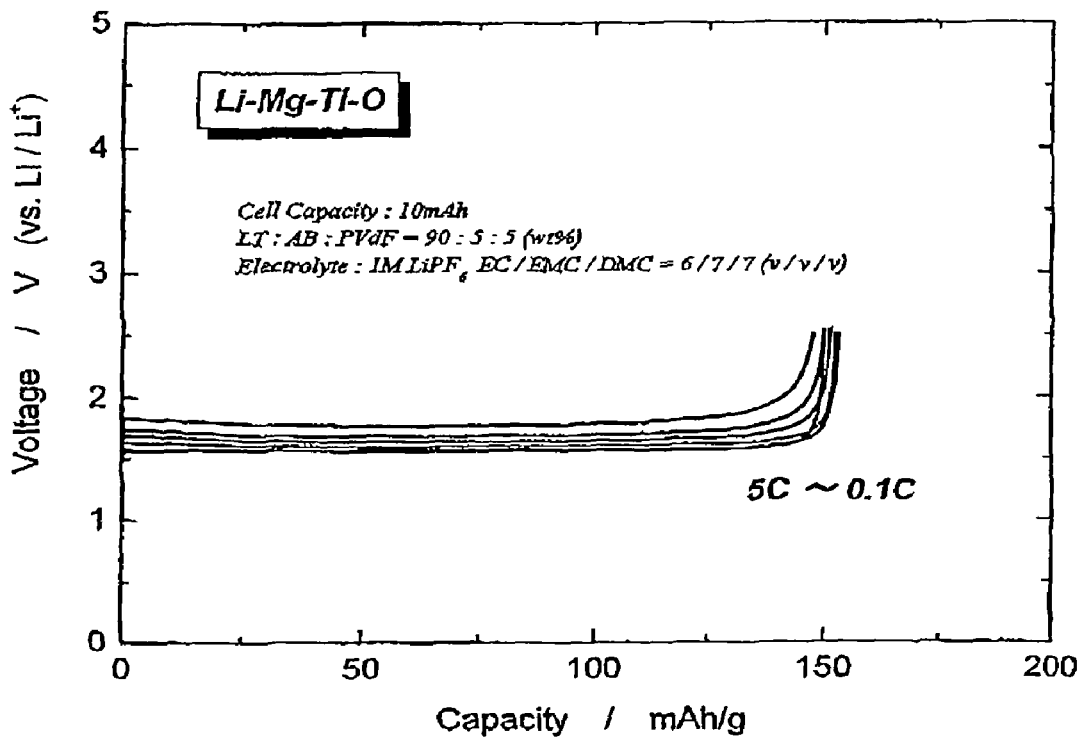
FIG. 2 is a graph showing a result of high rate discharge test of a lithium ion battery (example) using $Li[Li_{1/4}Mg_{1/8}Ti_{13/8}]O_4$ as a negative electrode active material.

A result of the high rate discharge test of the lithium ion battery (example) using $Li[Li_{1/4}Mg_{1/8}Ti_{13/8}]O_4$ as a negative electrode active material is shown in FIG. 2.

Figure 3:
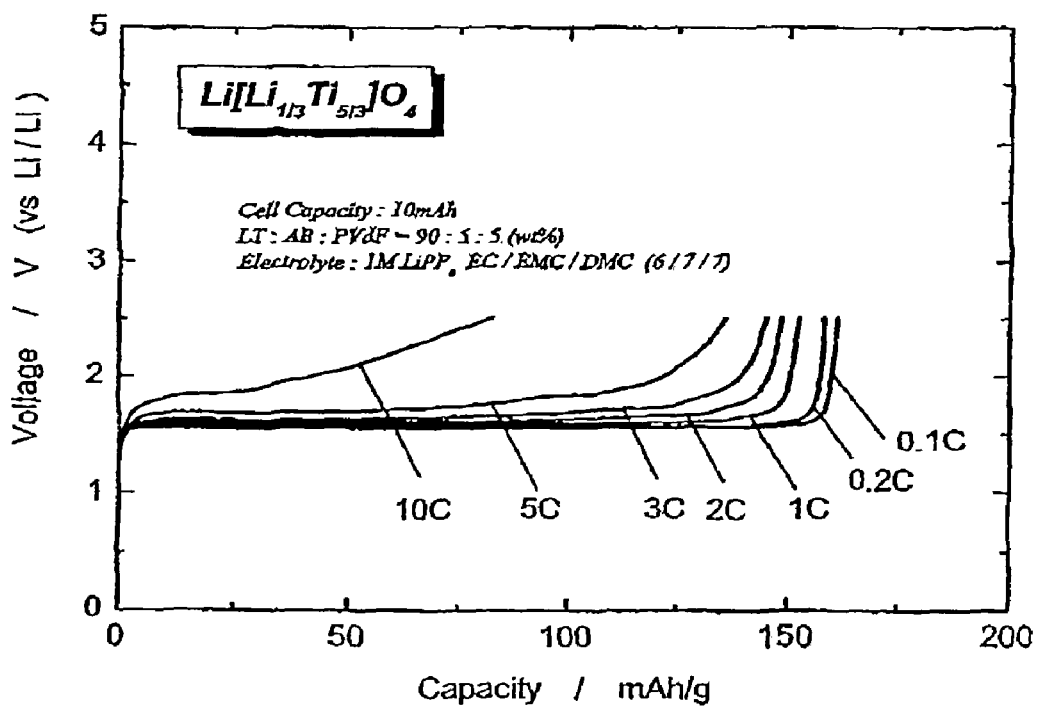
FIG. 3 is a graph showing a result of a high rate discharge test of a lithium ion battery (comparative example) using $Li[Li_{1/3}Ti_{5/3}]O_4$ as a negative electrode active material.

A result of the high rate discharge test of the lithium ion battery (comparative example) using $Li[Li_{1/3}Ti_{5/3}]O_4$ as a negative electrode active material is shown in FIG. 3.

Moreover, results of these battery tests are shown in Table 1. The capacity at 0.1 ItA was obtained in the $5^{th}$ cycle of discharge in the initial activation step and is a capacity in a flat potential range of up to 1.7 V against the reference electrode from the start of discharge values. Also at 0.2 ItA the potential range is similar. Test at other current values indicate capacities in an almost flat potential range of up to 2.0 V from the start of discharge.

The example shown in Table 1 is a battery using $Li[Li_{1/4}Al_{1/8}Ti_{13/8}]O_4$ as a negative electrode active material, and the comparative example is a battery using $Li[Li_{1/3}Ti_{5/3}]O_4$ as a negative electrode active material.

TABLE 1

| | Current Value | | | | | |
|---|---|---|---|---|---|---|
| | 0.1 ItA | 0.2 ItA | 1 ItA | 2 ItA | 3 ItA | 5 ItA |
| Example | 150.0 | 147.8 | 147.4 | 131.1 | 122.2 | 89.2 |
| Comparative Example | 139.7 | 140.2 | 132.7 | 120.0 | 104.0 | 65.0 |

(Unit: mAh/g)

From the comparison of FIG. 2 and FIG. 3 and from Table 1, it is shown that the battery of the example is improved in capacity in the potential flat part compared to the battery of the comparative example. From this, it can be seen that the active material of the example $Li[Li_{1/4}Mg_{1/8}Ti_{13/8}]O_4$ in which a part of the elements of $Li[Li_{1/3}Ti_{5/3}]O_4$ is substituted with Mg is an active material having a more distingue discharge capacity in the potential flat part than the active material of the comparative example $Li[Li_{1/3}Ti_{5/3}]O_4$.

INDUSTRIAL APPLICABILITY

As described above in detail, the present invention provides an active material for lithium ion battery having an excellent discharge capacity in the potential flat part and a high-performance and long-life lithium ion battery using the active material for lithium ion battery. Thus, the industrial applicability thereof is very outstanding.

The invention claimed is:

1. An active material for a lithium ion battery represented by a composition formula: $Li[Li_{(1-2x)/3}Mg_xTi_{(5-x)/3}]O_4$ (0.1<X<1/4), wherein Mg substitutes both Ti and Li.

2. A lithium ion battery comprising an active material for lithium ion battery according to claim 1, as a negative electrode active material.

3. A lithium ion battery according to claim 2, further comprising an electrolyte comprising LiPF6 dissolved in a mixed solvent of ethylene carbonate, ethylmethyl carbonate and dimethyl carbonate.

4. A lithium ion battery according to claim 3, further comprising a separator comprising a polypropylene microporous film having a surface modified by polyacrylate.

5. The active material for a lithium ion battery according to claim 1, wherein Mg substitutes a part of a six-coordinate 16d site of $Li[Li_{1/3}Ti_{5/3}]O_4$.

6. The lithium ion battery according to claim 1, wherein Ti is tetravalent before a first reduction occurs.

7. The lithium battery according to claim 1, wherein the active material is a single phase of a spinel structure.

8. An active material for a lithium ion battery represented by a composition formula: $Li[Li_{(1-2x)/3}Mg_xTi_{(5-x)/3}]O_4$ (0.1<x<1/4), wherein Mg that is represented as the molar ratio x replaces a part of Li and Ti.

* * * * *